(12) United States Patent
Rogers et al.

(10) Patent No.: US 9,696,188 B2
(45) Date of Patent: Jul. 4, 2017

(54) MAGNETIC FLOWMETER WITH AUTOMATIC ADJUSTMENT BASED ON SENSED COMPLEX IMPEDANCE

(71) Applicant: Rosemount Inc., Chanhassen, MN (US)

(72) Inventors: Steven Bruce Rogers, Minnetonka, MN (US); Bruce D. Rovner, Minneapolis, MN (US); Scot Ronald Foss, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 591 days.

(21) Appl. No.: 13/826,839

(22) Filed: Mar. 14, 2013

(65) Prior Publication Data

US 2014/0260662 A1    Sep. 18, 2014

(51) Int. Cl.
   *G01F 1/58*    (2006.01)
   *G01F 1/60*    (2006.01)

(52) U.S. Cl.
   CPC . *G01F 1/60* (2013.01); *G01F 1/58* (2013.01)

(58) Field of Classification Search
   CPC .......................................... G01F 1/64
   USPC ..... 702/12, 45, 46, 49, 100, 108; 73/152.18; 331/65
   See application file for complete search history.

(56) References Cited

U.S. PATENT DOCUMENTS

| | | | |
|---|---|---|---|
| 4,137,766 A * | 2/1979 | Handel | 73/861.11 |
| 4,672,331 A * | 6/1987 | Cushing | 331/65 |
| 4,856,345 A | 8/1989 | Mochizuki | |
| 5,297,425 A * | 3/1994 | Hamby et al. | 73/152.18 |
| 5,880,376 A | 3/1999 | Sai et al. | |
| 6,014,902 A | 1/2000 | Lewis et al. | |
| 7,619,418 B2 | 11/2009 | Schulz et al. | |
| 7,688,057 B2 | 3/2010 | Foss et al. | |
| 7,750,642 B2 | 7/2010 | Graber et al. | |
| 7,921,733 B2 | 4/2011 | Foss et al. | |
| 7,921,734 B2 | 4/2011 | Foss et al. | |
| 7,963,173 B2 | 6/2011 | Foss et al. | |
| 7,971,493 B2 * | 7/2011 | Hencken et al. | 73/861.12 |

(Continued)

FOREIGN PATENT DOCUMENTS

WO    2004090475 A2    10/2004
WO    2009146724 A1    12/2009

OTHER PUBLICATIONS

International Search Report and Written Opinion for PCT/US2014/025357, dated Jul. 17, 2014.

(Continued)

*Primary Examiner* — Alexander Satanovsky
*Assistant Examiner* — Felix Suarez
(74) *Attorney, Agent, or Firm* — Kinney & Lange, P.A.

(57) ABSTRACT

A magnetic flowmeter comprises a pipe section for process flow, a coil for generating a magnetic field across the pipe section, a current source for energizing the coil to generate the magnetic field at a coil drive frequency, and electrodes for sensing voltage induced across the process flow by the magnetic field. A processor calculates a function of the sensed voltage and generates a flow output based on the function. The processor adjusts an operating parameter of the flowmeter, such as electrode voltage sampling period, the coil drive frequency, or a phase shift, as a function of a sensed electrode-to-electrode or electrode-to-ground complex impedance.

11 Claims, 4 Drawing Sheets

(56) References Cited

U.S. PATENT DOCUMENTS

| | | |
|---|---|---|
| 8,032,234 B2 | 10/2011 | Foss et al. |
| 2003/0051557 A1 | 3/2003 | Ishikawa et al. |
| 2006/0174715 A1* | 8/2006 | Wehrs ........................ G01F 1/60 73/861.12 |
| 2008/0262796 A1 | 10/2008 | Rufer et al. |
| 2009/0205438 A1 | 8/2009 | Budmiger |
| 2010/0107776 A1 | 5/2010 | Shanahan |
| 2012/0041704 A1 | 2/2012 | Rovner et al. |
| 2013/0006544 A1 | 1/2013 | Rovner |

OTHER PUBLICATIONS

Rosemount Measurement, Magnetic Fowmeter Fundamentals, TDS 3032A00, English, Sep. 1995,10 pages.
Extended European Search Report, for European Patent Application No. 14775861.9, dated Oct. 7, 2016, 9 pages.

* cited by examiner

US 9,696,188 B2

MAGNETIC FLOWMETER WITH AUTOMATIC ADJUSTMENT BASED ON SENSED COMPLEX IMPEDANCE

BACKGROUND

This invention relates generally to fluid processing, and specifically to process flow measurement and control. In particular, the invention concerns measurement techniques for magnetic flowmeters.

Magnetic flowmeters (or mag meters) measure flow by Faraday induction, an electromagnetic effect. The meter energizes a coil to generate a magnetic field across a pipe section, and the magnetic field induces an electromotive force (EMF) across the process flow. The resulting potential difference (or voltage) is measured using a pair of electrodes that extend through the pipe section and into contact with the process flow, or via capacitive coupling. The flow velocity is proportional to the induced EMF, and the volumetric flow rate is proportional to the flow velocity and flow area.

In general, electromagnetic flow measurement techniques are applicable to water-based fluids, ionic solutions and other conducting flows. Specific uses include water treatment facilities, high-purity pharmaceutical manufacturing, hygienic food and beverage production, and chemical processing, including hazardous and corrosive process flows. Magnetic flowmeters are also employed in the hydrocarbon fuel industry, including hydraulic fracturing techniques utilizing abrasive and corrosive slurries, and in other hydrocarbon extraction and processing methods.

Magnetic flowmeters provide fast, accurate flow measurements in applications where differential pressure-based techniques are disfavored because of the associated pressure drop (for example, across an orifice plate or Venturi tube). Magnetic flowmeters can also be used when it is difficult or impractical to introduce a mechanical element into the process flow, such as turbine rotor, vortex-shedding element or Pitot tube.

Some magnetic flowmeters use field coils driven directly by AC line power. Another type of magnetic flowmeter, commonly referred to as a pulsed DC magnetic flowmeter, excites or powers the field coil periodically with a low frequency square wave. Pulsed DC magnetic flowmeters utilize a magnetic field which changes direction at a certain frequency. When the field is inverted, a spike in the electrode voltage is created by the rapidly changing magnetic field. This spike is not related to the flow rate, but to the rate of change of the magnetic field. In order to make a flow measurement, the electrode voltage measurement circuitry must be programmed to wait until this spike has completely decayed, or the voltage difference due to the decaying spike will appear to be measured flow.

The rate of decay of the voltage spike changes in relation to the impedance of the process fluid, which acts as a resistive-capacitive (RC) filter of the voltage spike. The impedance in turn depends on the conductivity of the process fluid, any coatings on the electrodes, and the length of the cable between the transmitter and the flow tube. Therefore, the rate of decay of the voltage spike is not known when the flowmeter leaves the factory and may change over time if the fluid conductivity changes or if coatings build up on the electrode surfaces.

Because the electrode-to-electrode impedance is not known in advance and may change over time, pulsed DC flowmeters are typically programmed to sample only at the very end of each half cycle where the probability of the voltage spike "leaking" into the flow measurement is very low. This measurement time may be, for example, only 20 percent of each half cycle.

SUMMARY

This invention relates to a magnetic flowmeter which makes an automatic adjustment of an operating parameter based on sensed complex impedance. The magnetic flowmeter includes a pipe section, a coil proximate an outer diameter of the pipe section, a current source, electrodes that extend to the inner diameter of the pipe section, and a processor that generates a flow output as a function of sensed voltage between the electrodes. The processor adjusts a flowmeter operating parameter as a function of a sensed complex impedance between the electrodes or between one or more of the electrodes and ground.

A further embodiment of the invention is a method of measuring flow. The method includes generating a magnetic field across a process flow and sensing, during an electrode voltage sensing period, a voltage induced between sensing electrodes by the magnetic field, and generating a flow output based on voltage sensed. The method further includes sensing a complex impedance between sensing electrodes or between one or more of the sensing electrodes and ground, and varying a flowmeter operating parameter as a function of the sensed complex impedance.

In another embodiment, a method of operating a magnetic flowmeter comprises sensing complex impedance between sensing electrodes or between one or more of the sensing electrodes and ground and automatically adjusting an operating parameter of the magnetic flowmeter as a function of the sensed complex impedance.

DETAILED DESCRIPTION

Figure 1:
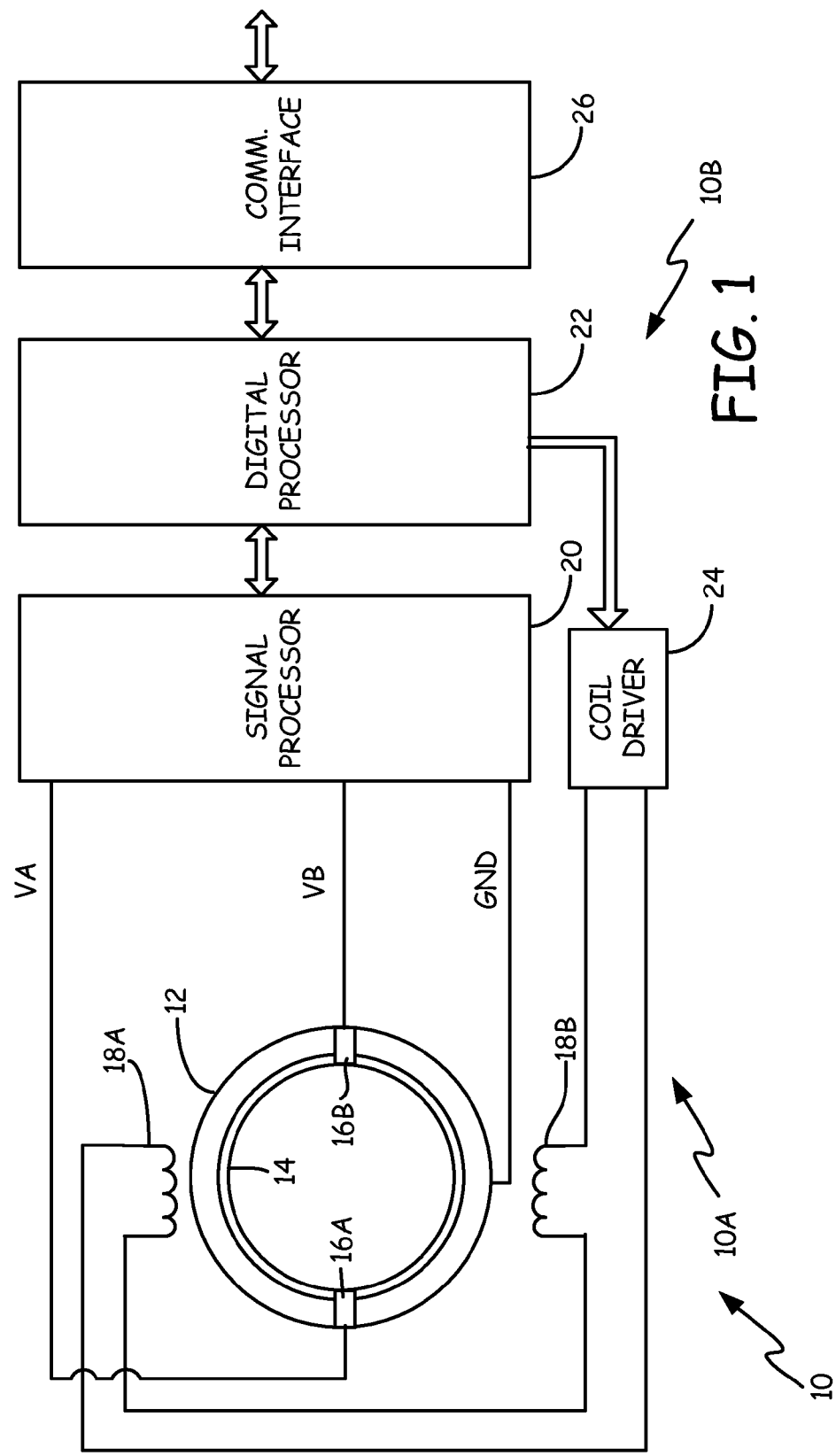
FIG. 1 is a block diagram of a pulsed DC magnetic flowmeter.

FIG. 1 shows an exemplary pulsed DC magnetic flowmeter 10, which includes primary section (or flow tube) 10A and secondary section (or transmitter) 10B. Flow tube 10A includes pipe 12, insulating liner 14, electrodes 16A and 16B, and field coils 18A and 18B.

The primary function of flow tube 10A is to produce a voltage proportional to the velocity of the fluid being measured. Field coils 18A and 18B are energized by passing a current through them to develop a magnetic field. In a pulsed DC magnetic flowmeter, the direction of the coil drive current is reversed periodically so that the magnetic field produced by field coils 18A and 18B changes direction. The process fluid flowing through the interior of flow pipe 10A functions as a moving conductor inducing a voltage in the fluid. The flush mounted electrodes 16A, 16B inside flow tube 10A are in direct electrical contact with the conductive process fluid, thereby picking up voltages present in the fluid. To prevent the voltage from being shorted, the fluid must be contained in an electrically insulating material. When pipe 12 is a metal tube, the insulation is provided by liner 14, which is a non-conducting material such as polyurethane, polytetrafluoroethylene (PTFE), or an insulating rubber material.

Transmitter 10B interprets the voltage generated at electrode 16A and 16B and transmits a standardized signal to a monitoring or control system. Secondary section 10B is commonly referred to as a transmitter or signal converter.

Transmitter 10B typically includes signal processor 20, digital processor 22, coil driver 24, and communication interface 26. Signal conversion, conditioning, and transmission are the principal functions of transmitter 10B.

Digital processor 22 controls the pulse frequency of the pulsed DC coil drive current supplied by coil driver 24 to coils 18A and 18B. The current waveform provided by coil driver 24 is a square wave having a frequency referred to as the pulse frequency. The coil drive may be periodically interrupted to turn coils 18A and 18B off. This allows periodic measurement of the voltage between electrodes 16A and 16B or between electrode 16A or electrode 16B and ground. These measurements may be used to sample and correct for noise induced voltages within flow tube 10A. The measurements may also be used to sense complex impedance, which can then be used to automatically adjust an operating parameter of magnetic flowmeter 10, such as electrode voltage sampling period or coil drive pulse frequency.

It is also possible to sense complex impedance without turning off the coils. A current can be applied through electrodes 16A and 16B at a frequency that is away from the drive frequency and/or asynchronous to the drive signal to coils 18A and 18B so that the flow rate can continue to be measured while the complex impedance sensing function is being performed.

Signal processor 20 is connected to electrodes 16A and 16B and to ground. The ground connection may be to pipe 12, or may be to a flange or pipe section upstream or downstream of pipe 12.

During the electrode voltage sampling period defined by digital processor 22, signal processor 20 monitors potential VA at electrode 16A and potential VB at electrode 16B. Signal processor 20 produces a voltage representing the difference in potential between electrode 16A and 16B and converts that voltage into a digital signal representing the electrode voltage during the electrode voltage sampling period. Digital processor 22 may perform further signal processing and grooming of the digital signals received from signal processor 20. Digital processor 22 supplies a flow measurement value to communication interface 26, which communicates that value to a read out or control system (not shown). The communication by communication interface 26 can be in the form of an analog current level which varies between 4 and 20 mA; a HART® communication protocol in which digital information is modulated upon a 4-20 mA current; a communication protocol over a digital bus such as, for example, Fieldbus (IEC 61158); or wireless communication over a wireless network using a wireless protocol such as, for example, WirelessHART® (IEC 62951).

Figure 2A:
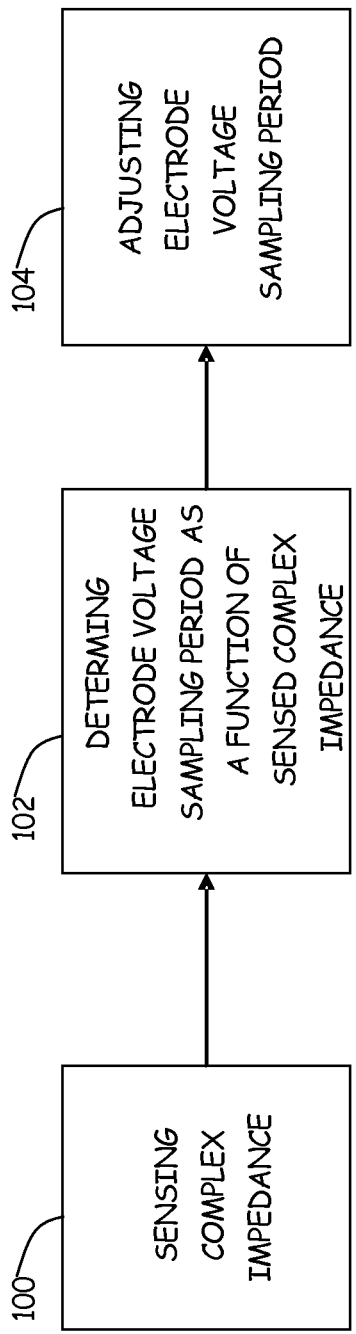
FIGS. 2A and 2B are block diagrams illustrating embodiments for adjusting the operating parameters of electrode voltage sampling period or coil drive pulse frequency, respectively, as a function of sensed complex impedance.
Figure 2B:
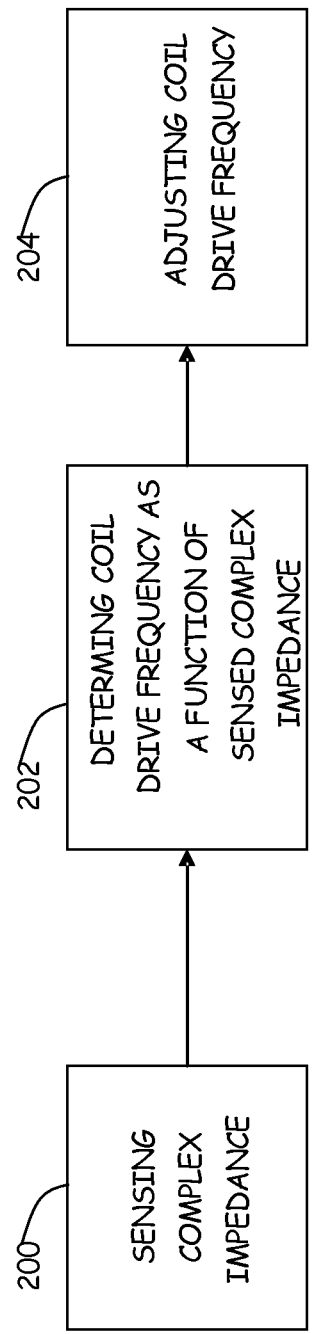

Signal processor 20 can also monitor complex impedance within flow tube 10A, which will vary depending on conductivity of the fluid flowing through flow tube 10A, the presence of any coatings built up on the surfaces of electrode 16A and 16B, and the length of cable between flow tube 10A and transmitter 10B. In this sensing function, signal processor 20 applies a current through electrodes 16A and 16B. The voltage between electrode 16A and 16B or between either electrode 16A or 16B and ground can be used by digital processor 22 to derive the value of a sensed complex impedance, which can then be used to automatically adjust an operating parameter of magnetic flowmeter 10 as shown in FIGS. 2A and 2B. FIGS. 2A and 2B are block diagrams illustrating embodiments for adjusting the operating parameters of electrode voltage sampling period or coil drive pulse frequency, respectively, as a function of sensed complex impedance. As shown in the embodiment of FIG. 2A, a complex impedance is sensed (Step 100), then an electrode voltage sampling period is determined as a function of the sensed complex impedance (Step 102). Finally, the electrode voltage sampling period is adjusted to the sampling period determined as a function of the sensed complex impedance to enhance the signal-to-noise ratio (Step 104). Similarly, in the embodiment of FIG. 2B, a complex impedance is sensed (Step 200), and then a coil drive frequency is determined as a function of the sensed complex impedance (Step 202). Finally, the coil drive frequency is adjusted to the coil drive frequency determined as a function of the sensed complex impedance to enhance the signal-to-noise ratio (Step 204). In some embodiments, sensed complex impedance may be employed to adjust both electrode voltage sampling period and coil drive pulse frequency.

Thus, based upon the sensed complex impedance, digital processor 22 can vary electrode voltage sampling period or the coil drive pulse frequency, or both in a way that will enhance the signal-to-noise ratio. In particular, electrode voltage sampling period may be adjusted in an inverse relationship to sensed complex impedance, so that as the sensed complex impedance decreases, the electrode voltage sampling period may be increased. Adjustment of coil drive pulse frequency is also according to an inverse relationship with sensed complex impedance. As complex impedance decreases, the coil drive pulse frequency may be increased.

Figure 3:
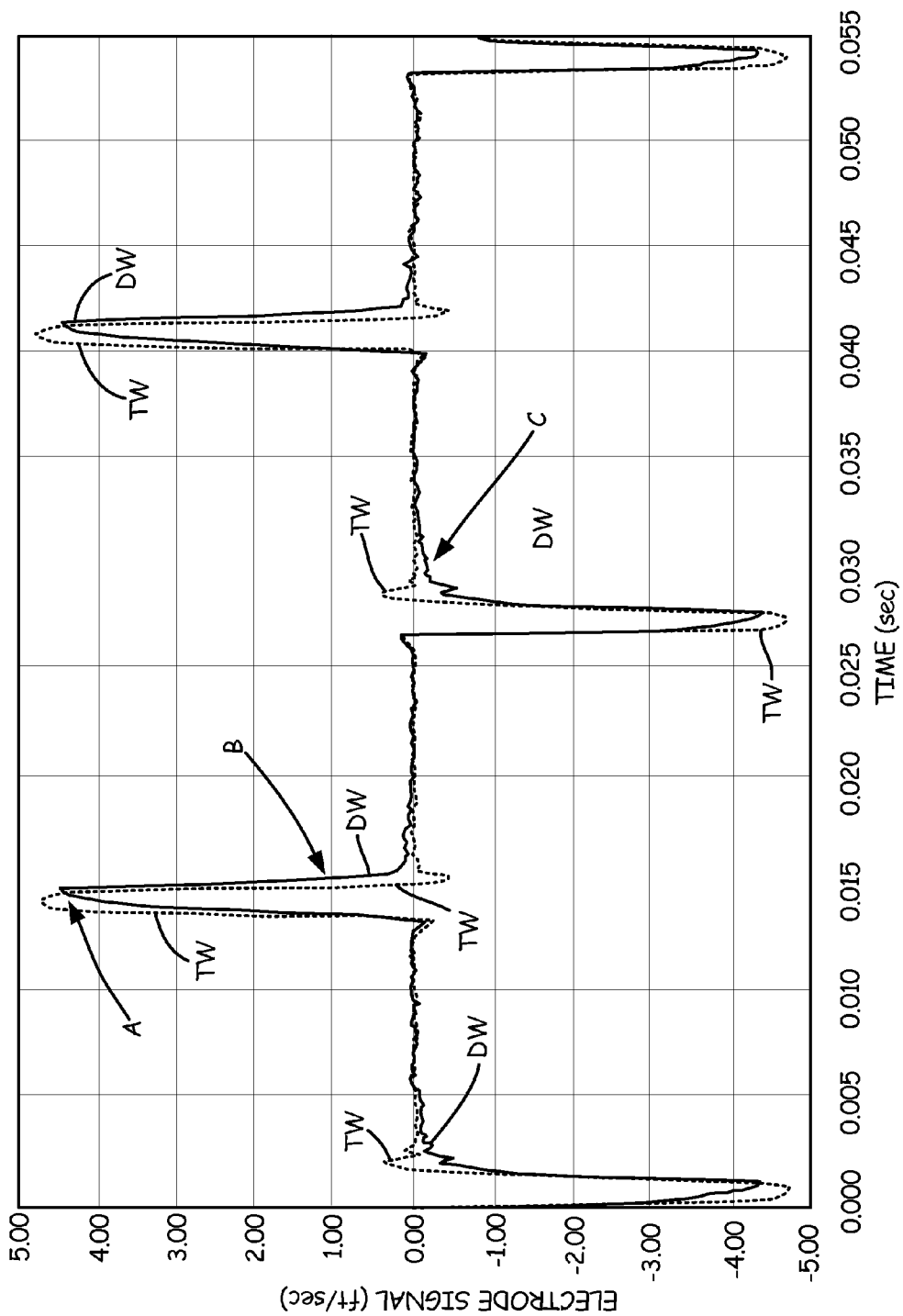
FIG. 3 is a graph showing electrode signal as a function of time for a pulsed DC magnetic flowmeter with a flow tube filled with water of two different conductivities.

FIG. 3 is a graph showing electrode signal as a function of time for a pulse DC magnetic flowmeter. This graph is taken from a 6 inch Rosemount 8705 flow tube filed with water at two different conductivities. The coil drive pulse frequency is set to 37 Hz. The first sample was deionized water (DW) with a conductivity adjusted to 5 µS/cm, the minimum specified conductivity for the Rosemount 8705 flow tube. The second sample was standard tap water (TW), for which the conductivity measured 220 µS/cm.

As shown in region A in FIG. 3, the amplitude of the spike produced by the reversal of magnetic field direction is lower in the deionized water (DW) waveform than in the tap water (TW) waveform.

Area B shows the falling edge of the spike in the DW waveform lags the falling edge of the TW waveform spike. Area C shows that the spike of the DW waveform decays more slowly than the TW waveform.

FIG. 4 again shows a deionized water (DW) waveform and a tap water (TW) waveform. The coil frequency was again 37 Hz. The deionized water had a conductivity of 5 µS/cm, and the tap water had a conductivity of 220 µS/cm.

Figure 4:
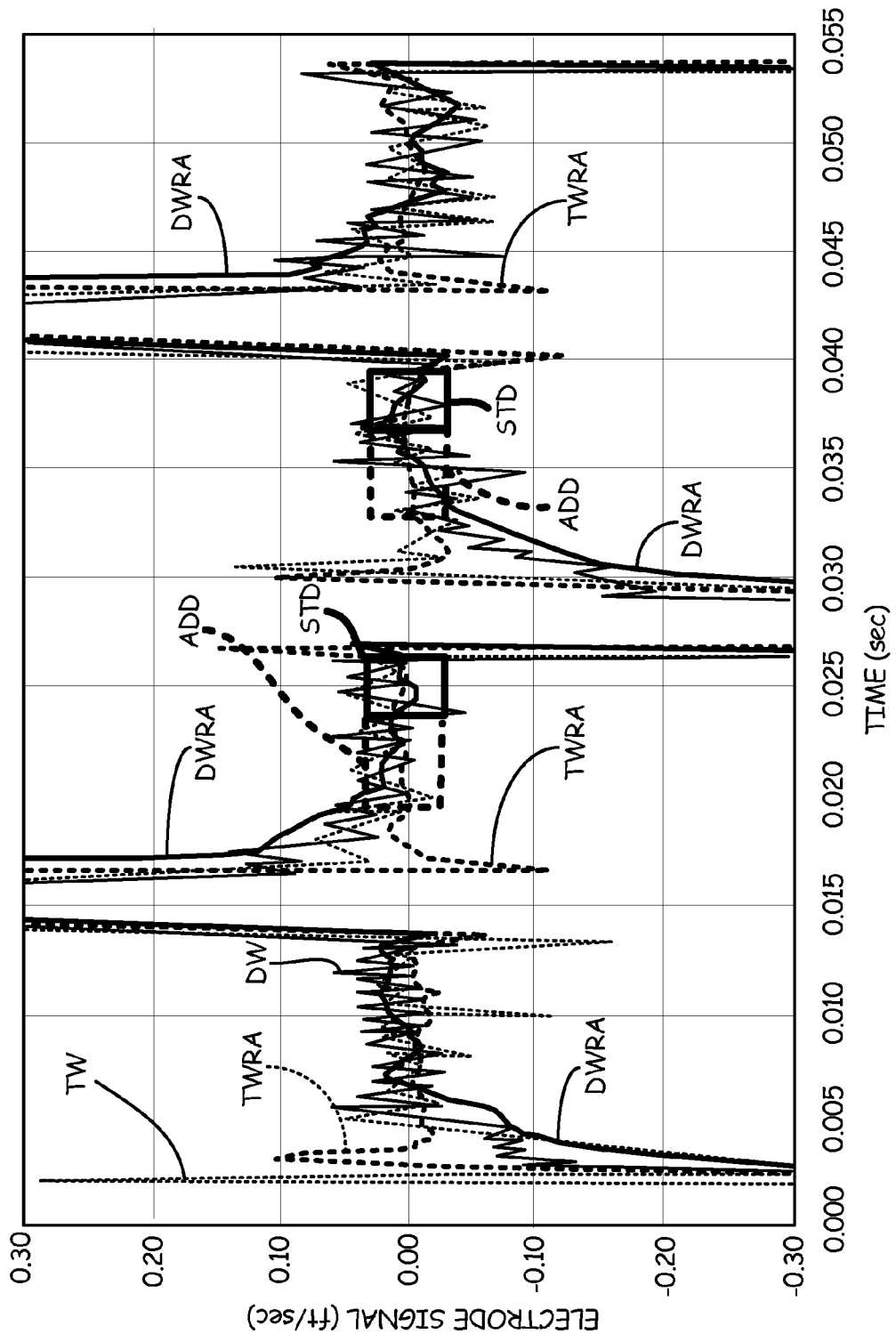
FIG. 4 is a graph showing electrode signal as a function of time for a pulsed DC magnetic flowmeter with flow tube filled with water of two different conductivities, and further illustrating the automatic adjustment of the electronic voltage sampling period based upon sensed complex impedance.

In FIG. 4, the TW and DW signals have been superimposed with a 15 period moving average labeled DWRA and TWRA. These rolling average waveforms make it easier to see the spike decay through the noise.

The graph in FIG. 4 is marked with the standard 20% electrode voltage sampling period used in pulse DC magnetic flowmeter. This standard 20% period is labeled STD in FIG. 4.

Also shown by dashed line in FIG. 4 is an increase to the electrode voltage sample time, labeled ADD. This represents additional sampling time that is possible for higher conductivity fluids.

The deionized water sample does not decay to near zero until shortly before the standard (20%) electrode voltage sampling period STD begins. The sampling period for deionized water, therefore, is approximately optimal.

The tap water (TW) spike, in contrast, has completely decayed long before standard electrode voltage sampling period STD begins. This means a longer sampling period can be used, which results in a higher signal-to-noise ratio. In the example shown in FIG. 4, the sampling period (STD+ADD) can be nearly triple the STD sampling period.

The ability to use a longer sampling period depends on being able to measure impedance of the process fluid, which permits a prediction of the decay time. Since the majority of process fluids that flow through magnetic flowmeters have a conductivity equal to or greater than tap water, most flow measurements using a magnetic flowmeter may benefit from increased sampling time.

Signal-to-noise ratio increases can lead to improvements in magnetic flowmeter performance. Alternatively, a reduction in power to the field coils could be realized without compromising performance. Fluids with conductivities higher than that of tap water would settle even faster, so they could see even larger improvements.

The benefits achieved by an automatic adjustment of electrode voltage sampling interval as a function of sensed complex impedance can be obtained without significant additional cost. In general, the changes to circuitry in the transmitter are minimal, and the determination of complex impedance and determination of the adjustment to the sampling period can be accomplished with software changes in digital processor 22.

In another embodiment of the invention, coil drive frequency can also be automatically adjusted based on the impedance of the fluid. Generally, a higher frequency coil drive improves the signal-to-noise ratio, because process noise tends to be lower at higher frequencies. However, operating at higher frequencies has a limitation of a less reliable zero, because the voltage spike may not have completely decayed, and the decay time is not known because the fluid impedance is not taken into account. By sensing complex impedance of the fluid and adjusting the coil drive frequency accordingly, transmitter 10B can operate magnetic flowmeter 10 at a maximum possible frequency without compromising zero stability.

Varying of an operating parameter of the magnetic flowmeter based on sensed complex impedance is also applicable to AC driven magnetic flowmeters. For example, sensed complex impedance could be used to adjust phase shift of the electrode signal based on electrode impedance. This provides better quadrature alignment, thereby reducing zero drift and may improve noise reduction depending on the measurement technique employed.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A magnetic flowmeter comprising:
   a pipe section having an inner diameter and an outer diameter;
   a coil proximate the outer diameter of the pipe section;
   a current source connected to the coil to produce an alternating magnetic field at a coil drive frequency;
   electrodes extending from the outer diameter of the pipe section to the inner diameter of the pipe section; and
   a processor that generates a flow output as a function of a sensed voltage between the electrodes, wherein the processor adjusts one of a coil drive frequency, an electrode voltage sampling period, or a phase shift of an electrode signal as a function of a sensed complex impedance of a process fluid flowing within the pipe section, the complex impedance sensed between the electrodes or between one or more of the electrodes and ground.

2. The magnetic flowmeter of claim 1, wherein the processor adjusts the coil drive frequency in an inverse relationship to the sensed complex impedance.

3. The magnetic flowmeter of claim 1, wherein the processor adjusts the electrode voltage sampling period in an inverse relationship to the sensed complex impedance.

4. The magnetic flowmeter of claim 1, wherein the current source is a pulsed DC current source.

5. The magnetic flowmeter of claim 1, wherein the current source is an AC current source.

6. A method of measuring flow, the method comprising:
   generating an alternating magnetic field across a flow of a process fluid;
   sensing a voltage induced between sensing electrodes by the alternating magnetic field;
   generating a flow output based on the voltage sensed;
   sensing a complex impedance of the process fluid, the complex impedance sensed between sensing electrodes or between one or more of the sensing electrodes and ground; and
   varying one of a coil drive frequency, an electrode voltage sampling period, or a phase shift of an electrode signal as a function of the sensed complex impedance.

7. The method of claim 6, wherein the electrode voltage sampling period is adjusted in an inverse relationship to the sensed complex impedance.

8. The method of claim 6, wherein the coil drive frequency is adjusted in an inverse relationship to the sensed complex impedance.

9. A method of operating a magnetic flowmeter, the method comprising:
   sensing a complex impedance of a process fluid, the complex impedance sensed between sensing electrodes or between one or more of the sensing electrodes and ground; and
   automatically adjusting one of a coil drive frequency, an electrode voltage sampling period, or a phase shift of an electrode signal of the magnetic flowmeter as a function of the sensed complex impedance.

10. The method of claim 9, wherein the electrode voltage sampling period is adjusted in an inverse relationship to the sensed complex impedance.

11. The method of claim 9, wherein the coil drive pulse frequency is adjusted in an inverse relationship to the sensed complex impedance.

* * * * *